(12) United States Patent
Karlen et al.

(10) Patent No.: US 11,192,188 B2
(45) Date of Patent: Dec. 7, 2021

(54) METHOD OF MANUFACTURING ALUMINUM ALLOY ARTICLES

(71) Applicant: Hamilton Sundstrand Corporation, Charlotte, NC (US)

(72) Inventors: Eric Karlen, Rockford, IL (US); William Louis Wentland, Rockford, IL (US); Sergey Mironets, Charlotte, NC (US); Robert Bianco, Columbia Station, OH (US)

(73) Assignee: HAMILTON SUNDSTRAND CORPORATION, Charlotte, NC (US)

( * ) Notice: Subject to any disclaimer, the term of this patent is extended or adjusted under 35 U.S.C. 154(b) by 858 days.

(21) Appl. No.: 15/607,086

(22) Filed: May 26, 2017

(65) Prior Publication Data
US 2018/0339339 A1    Nov. 29, 2018

(51) Int. Cl.
| | |
|---|---|
| *B22F 3/105* | (2006.01) |
| *B22F 9/04* | (2006.01) |
| *C22C 21/00* | (2006.01) |
| *C22C 28/00* | (2006.01) |
| *B22F 10/20* | (2021.01) |
| *B22F 1/00* | (2006.01) |
| *B33Y 70/00* | (2020.01) |
| *B33Y 10/00* | (2015.01) |

(52) U.S. Cl.
CPC ............ *B22F 10/20* (2021.01); *B22F 1/0003* (2013.01); *B22F 9/04* (2013.01); *B33Y 10/00* (2014.12); *B33Y 70/00* (2014.12); *C22C 21/00* (2013.01); *C22C 28/00* (2013.01)

(58) Field of Classification Search
None
See application file for complete search history.

(56) References Cited

U.S. PATENT DOCUMENTS

| | | |
|---|---|---|
| 5,478,220 A | 12/1995 | Kamitsuma et al. |
| 7,854,252 B2 | 12/2010 | Song et al. |
| (Continued) | | |

FOREIGN PATENT DOCUMENTS

| | | |
|---|---|---|
| CN | 1301878 A | 7/2001 |
| CN | 1851010 A | 10/2006 |
| (Continued) | | |

OTHER PUBLICATIONS

Gibson, Ian, et al. Additive Manufacturing Technologies: Rapid Prototyping to Direct Digital Manufacturing. Springer, 2010. (Year: 2010).*

(Continued)

*Primary Examiner* — Anthony M Liang
(74) *Attorney, Agent, or Firm* — Cantor Colburn LLP

(57) ABSTRACT

A method for making an article is disclosed. The method involves inputting a digital model of an article into an additive manufacturing apparatus comprising an energy source. The additive manufacturing apparatus applies energy from the energy source to successively applied incremental quantities of a powder to fuse the powder to form the article corresponding to the digital model. The powder includes an aluminum alloy having 2.00-9.00 wt. % cerium, 0.25-3.00 wt. % silicon, 0.25-0.75 wt. % magnesium, 0-0.75 wt. % iron, 0-0.05 wt. % other alloying elements, and the balance of aluminum, based on the total weight of the aluminum alloy.

12 Claims, 1 Drawing Sheet

(56) References Cited

U.S. PATENT DOCUMENTS

| | | | |
|---|---|---|---|
| 8,852,365 B2 | 10/2014 | Sankaran et al. | |
| 2009/0263266 A1 | 10/2009 | Pandey | |
| 2015/0290671 A1* | 10/2015 | Jakimov | B29C 64/153 |
| | | | 427/180 |
| 2017/0016093 A1 | 1/2017 | Karlen et al. | |
| 2017/0016094 A1 | 1/2017 | Karlen et al. | |
| 2017/0016096 A1 | 1/2017 | Wentland et al. | |
| 2017/0096730 A1 | 4/2017 | Rios et al. | |
| 2018/0080103 A1* | 3/2018 | Plotkowski | C22C 1/0416 |
| 2018/0339340 A1 | 11/2018 | Karlen et al. | |

FOREIGN PATENT DOCUMENTS

| | | |
|---|---|---|
| DE | 479528 C | 7/1929 |
| JP | H01272739 A | 10/1989 |

OTHER PUBLICATIONS

European Search Report from the European Patent Office for EP Application No. 18173181.1 dated Oct. 25, 2018, 20 pages.
European Search Report from the European Patent Office for EP Application No. 18173586.1 dated Oct. 22, 2018, 8 pages.
Plotkowski, A. et al., "Evaluation of an Al-Ce alloy for laser additive manufacturing", ACTA Materialia, Elsevier, Oxford, GB, vol. 126, Dec. 27, 2016, pp. 507-519.

* cited by examiner

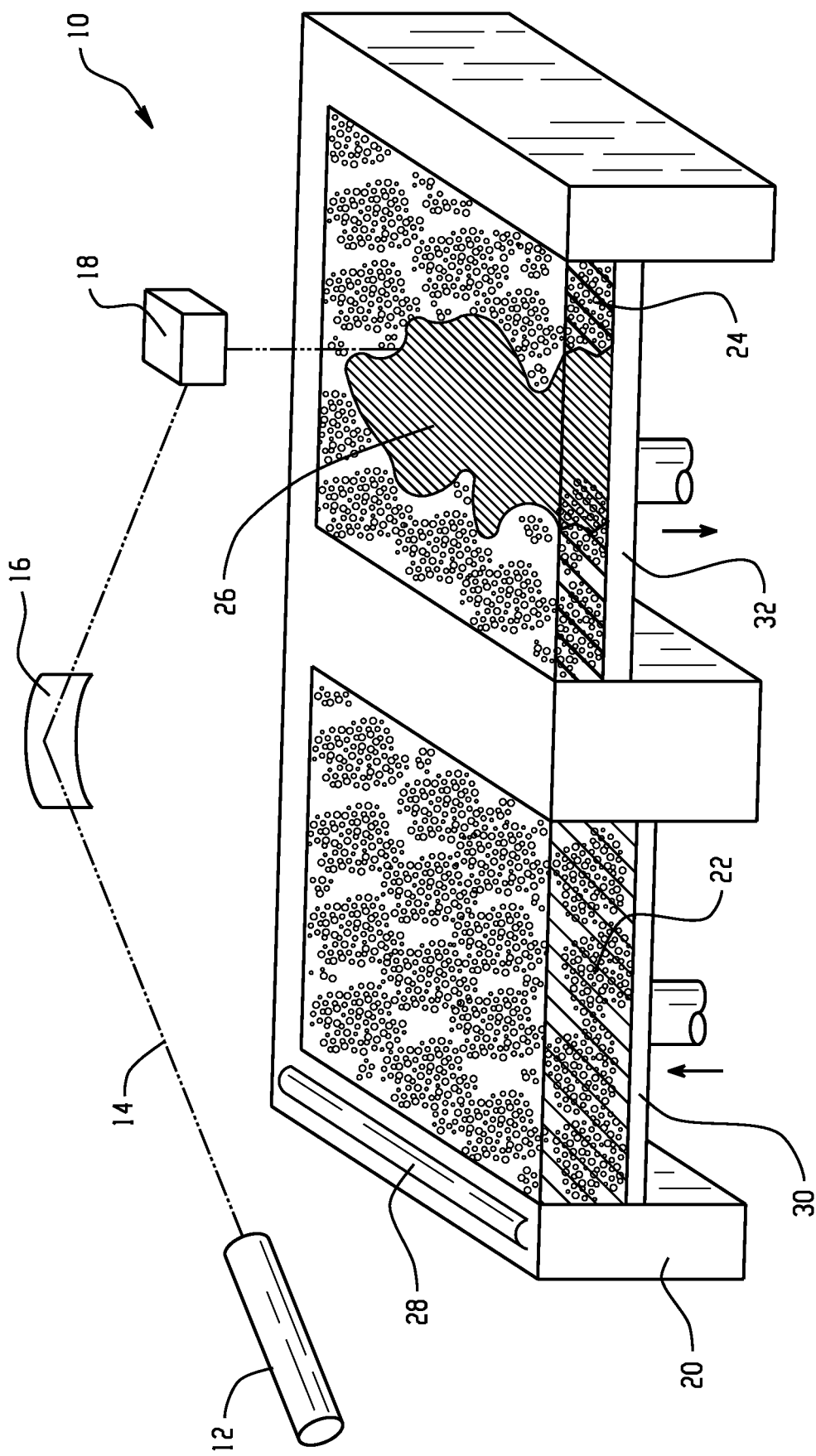

METHOD OF MANUFACTURING ALUMINUM ALLOY ARTICLES

BACKGROUND

This disclosure relates to additive manufacturing of aluminum articles.

Additive manufacturing technologies have been used and proposed for use for fabricating various types of articles from various types of materials. Broadly viewed, additive manufacturing can include any manufacturing process that incrementally adds material to an assembly during fabrication, and has been around in one form or another for many years. Modern additive manufacturing techniques, however, have been blended with three-dimensional computer imaging and modeling in various types to produce shapes and physical features on articles that are not readily produced with conventional molding, shaping, or machining techniques. Such techniques were initially developed using polymer compositions that are fusible or polymerizable in response to a controllable source of light or radiation such as a laser. Three-dimensional articles can be fabricated a layer at a time based on data from a corresponding layer of a three-dimensional computer model, which is generally known as stereolithography. With these techniques, a polymer powder or polymerizable liquid polymer composition is exposed to a source of energy such as a laser to fuse a thermoplastic polymer powder by heating it to a fluid state or by initiating a reaction between components in a powder or polymerizable liquid composition. The powder or liquid can be applied a layer at a time by any known mechanism such as by spray or other application, but is often maintained in a bed where the article being fabricated is formed. After each layer is fused and solidified, the article is lowered in the bed or the level of the bed is raised so that a layer of powder or liquid covers the previously-formed layer of the article, and another layer of the powder or liquid is fused and solidified by selective exposure to the energy source based on data from another corresponding layer of the computer model.

Additive manufacturing techniques have also been used for the fabrication of metal articles. Metal thermal spray and other additive manufacturing techniques for metals have of course been known for some time. The application of stereolithographic manufacturing techniques to metals has led to significant advancements in the fabrication of three-dimensional metal articles. Using such techniques, a metal article being manufactured is maintained in a bed of metal powder, with the surface of the article below the surface of the powder in the bed so that there is a layer of metal powder over the surface of the article. Metal powder in this layer is selectively fused such as by selective exposure to an energy source such as a laser or electron beam, according to data from a corresponding layer of a three-dimensional computer model of the article. After each layer is fused and solidified, the article is lowered in the bed or the level of the bed is raised so that a layer of metal powder covers the previously-formed layer of the article, and another layer of the powder is fused and solidified by selective exposure to the energy source based on data from another corresponding layer of the computer model. The resulting can be relatively complex, compared to structures obtainable by conventional metal fabrication techniques such as casting, forging, and mechanical deformation.

Attempts to fabricate aluminum and aluminum alloy articles using additive manufacturing techniques have met with limited success. Aluminum alloys used for casting have been proposed or tried for powder casting or additive manufacturing. However, many such alloys have limitations on strength or other physical properties that renders them unsuitable for many applications, including but not limited to aerospace and other applications requiring strength. For example, the alloy AlSi10Mg has been evaluated for additive manufacturing, but exhibits poor ductility and fracture toughness. High-strength aluminum alloys are also known. For example aluminum alloys 6061 and 7075 are well-known for their high strength in wrought aluminum articles. However, articles formed from these alloys using additive manufacturing techniques are susceptible to crack formation.

BRIEF DESCRIPTION

According to some aspects of the disclosure, a method for making an article comprises first generating a digital model of the article. The digital model is inputted into an additive manufacturing apparatus comprising an energy source. The additive manufacturing apparatus applies energy from the energy source to successively applied incremental quantities of a powder to fuse the powder to form the article corresponding to the digital model. As described herein, the powder comprises an aluminum alloy comprising 2.00-9.00 wt. % cerium, 0.25-3.00 wt. % silicon, 0.25-0.75 wt. % magnesium, 0-0.75 wt. % iron, 0-0.05 wt. % other alloying elements, and the balance of aluminum, based on the total weight of the aluminum alloy.

In some aspects of the disclosure, the method also comprises selectively exposing incremental quantities of aluminum alloy powder in a layer of a powder bed over a support with a laser or electron beam to fuse the selectively exposed aluminum alloy powder in a pattern over the support corresponding to a layer of the digital model of the article. Then, the method repeatedly: provides a layer of the powder over the selectively exposed layer and selectively exposes incremental quantities of aluminum alloy powder in the layer to fuse the selectively exposed aluminum alloy powder in a pattern corresponding to another layer of the digital model of the article.

In some aspects of the disclosure, an aluminum alloy comprises 2.00-9.00 wt. % cerium, 0.25-3.00 wt. % silicon, 0.25-0.75 wt. % magnesium, 0-0.75 wt. % iron, 0-0.05 wt. % other alloying elements, and the balance of aluminum, based on the total weight of the aluminum alloy.

BRIEF DESCRIPTION OF THE DRAWINGS

The subject matter which is regarded as the disclosure is particularly pointed out and distinctly claimed in the claims at the conclusion of the specification. The foregoing and other features, and advantages of the disclosure are apparent from the following detailed description taken in conjunction with the accompanying drawings in which:

The FIGURE is a schematic depiction of an apparatus for making an article according to the methods described herein.

DETAILED DESCRIPTION

Referring now to the FIGURE, an example of an additive manufacturing system or apparatus 10 includes energy source 12 that generates an energy beam 14, a first mirror or other optical guide 16, a second mirror or optical guide 18, a frame 20, a powder supply 22, a powder processing bed 24, sintered powder material 26, a spreader 28, a powder supply support 30, and a stack support 32. Of course, the illustration in the FIGURE is schematic in nature, and many alternative designs of additive manufacturing devices are possible. Various types of additive manufacturing materials, energy sources, and processes can be used to fabricate the air temperature sensor housing and the individual features thereof that are described herein. The type of additive manufacturing process used depends in part on the type of material out of which it is desired to manufacture the sensor housing. In some embodiments, the sensor housing is made of metal, and a metal-forming additive manufacturing process can be used. Such processes can include selective laser sintering (SLS) or direct metal laser sintering (DMLS), in which a layer of metal or metal alloy powder is applied to the workpiece being fabricated and selectively sintered according to the digital model with heat energy from a directed laser beam. Another type of metal-forming process includes selective laser melting (SLM) or electron beam melting (EBM), in which heat energy provided by a directed laser or electron beam is used to selectively melt (instead of sinter) the metal powder so that it fuses as it cools and solidifies. The FIGURE merely illustrates one potential additive manufacturing system for creating an additively manufactured article.

Energy source 12 can be any source capable of creating focused energy. For example, energy source 12 can be a laser or an electron beam generator. Energy source 12 generates an energy beam 14, which is a beam of focused or focusable energy, such as a laser beam or an electron beam. Optical guide 16 such as a mirror is present in some embodiments to deflect radiation in a desired direction. A second optical guide 18, such as an optical head is present in some embodiments, and also directs energy in a desired direction. For example, optical guide 18 can include a mirror and be attached to an x-y positioning device. Frame 20 is used to contain powder material in powder supply 22 and in powder processing bed 24. Powder supply 22 and powder processing bed 24 include powder material, such as or powdered metals. Powder processing bed 24 further includes fused powder 26. Fused powder 26 is powder contained within powder processing bed 24 that has been at least partially sintered or melted. Spreader 28 is a spreading device such as an air knife using an inert gas instead of air, which can transfer powder material from powder supply 22 to powder processing bed 24. Powder supply support 30 and stack support 32 are used to raise and/or lower material thereon during additive manufacturing.

During operation, energy source 12 generates energy beam 14, which is directed by the optical guides 16 and 18 to the powder processing bed 24. The energy intensity and scanning rate and pattern of the energy beam 14 can be controlled to produce a desired result in the powder processing bed. In some aspects, the result can be partial melting of powder particles resulting in a fused structure after solidification such as a sintered powder metal structure having some degree of porosity derived from the gap spaces between fused powder particles. In some aspects, the result from exposure to the energy beam 14 can be complete localized melting and fluidization of the powder particles producing a metal article having a density approaching or equal to that of a cast metal article. In some aspects, the energy beam provides homogeneous melting such that an examination of the manufactured articles can detect no particle pattern from the original particles. After each layer of the additively manufactured article is completed, powder supply support 30 is moved to raise the height of powder material supply 22 with respect to frame. Similarly, stack support 32 is moved to lower the height of article with respect to frame 20. Spreader 28 transfers a layer of powder from powder supply 22 to powder processing bed 24. By repeating the process several times, an object may be constructed layer by layer. Components manufactured in this manner may be made as a single, solid component, and are generally stronger if they contain a smaller percentage of oxygen, hydrogen, or carbonaceous gases. Embodiments of the present invention reduce the quantity of impurities of, for example, oxygen, to less than 50 ppm, or even less than 20 ppm.

The digital models used in the practice of the disclosure are well-known in the art, and do not require further detailed description here. The digital model can be generated from various types of computer aided design (CAD) software, and various formats are known, including but not limited to SLT (standard tessellation language) files, AMF (additive manufacturing format) files, PLY files, wavefront (.obj) files, and others that can be open source or proprietary file formats.

As mentioned above, the powder used in the methods described herein comprises an aluminum alloy. Aluminum alloys and techniques for preparing them are well-known in the art as described, for example, in Aluminum and Aluminum Alloys, ASM Specialty Handbook, J. R. Davis, ASM International, the disclosure of which is incorporated herein by reference in its entirety. Alloys can be formed by melting the base alloy elements in a crucible curing with rapid solidification, followed by cutting and grinding operations to form a metal powder. Particle sizes for the aluminum alloy powder can range from 10 µm to 100 µm. In some aspects, the alloy elements can be combined together before forming a powder having a homogeneous composition. In some aspects, such as particles will fully melt, one or more of the individual alloy elements can have its own powder particles that are mixed with particles of other elements in the alloy mixture, with formation of the actual alloy to occur during the fusion step of the additive manufacturing process. In some aspects, the powder is "neat", i.e., it includes only particles of the alloy or alloy elements. In other aspects, the powder can include other components such as polymer powder particles. In selective sintering, polymer particles can help to temporarily bind metal powder particles together during processing, to be later removed by pyrolysis caused by the energy source or post-fabrication thermal processing. In some embodiments, the article can be subjected to post-fabrication thermal processing such as solution heat treatment or precipitation aging to promote formation of phase particles such as intermetallic phase particles.

As mentioned above, the aluminum alloy described herein comprises 2.00-9.00 wt. % cerium, 0.25-3.00 wt. % silicon, 0.25-0.75 wt. % magnesium, 0-0.75 wt. % iron, 0-0.05 wt. % other alloying elements, and the balance of aluminum, based on the total weight of the aluminum alloy. The other alloying elements can be selected among those known in the art for use in aluminum alloys. In some embodiments, aluminum alloy elements can form cerium-rich phase zones (also referred to in the metallurgical field as "particles"), which can help promote strength by inhibiting dislocation movement to resist deformation. In some embodiments, magnesium can promote formation of intermetallic phase particles comprising magnesium and aluminum. In some embodiments, iron can promote the formation of intermetallic phase particles comprising iron and aluminum.

In some, more specific, embodiments, the alloy can comprise ranges of elements as specified below. In some embodiments, the alloy can comprise 2.00-4.00 wt. % cerium, based on the total weight of the aluminum alloy. In some embodiments, the alloy can comprise 5.00-7.00 wt. % cerium, based on the total weight of the aluminum alloy. In some embodiments, the alloy can comprise 7.00-9.00 wt. % cerium, based on the total weight of the aluminum alloy. In some embodiments, the alloy can comprise 0.25-1.00 wt. % silicon, based on the total weight of the aluminum alloy. In some embodiments, the alloy can comprise 1.00-2.00 wt. % silicon, based on the total weight of the aluminum alloy. In some embodiments, the alloy can comprise 2.00-3.00 wt. % silicon, based on the total weight of the aluminum alloy. In some embodiments, the aluminum alloy can comprise iron in an amount (i.e., greater than 0 wt. % iron) up to 0.30 wt. %, based on the total weight of the aluminum alloy. In some embodiments, the alloy can comprise 0.25-0.75 wt. % iron, based on the total weight of the aluminum alloy. In some embodiments, the alloy can comprise 2.00-4.00 wt. % cerium and 0.25-1.00 wt. % silicon, based on the total weight of the aluminum alloy. In some embodiments, the alloy can comprise 2.00-4.00 wt. % cerium and 1.00-2.00 wt. % silicon, based on the total weight of the aluminum alloy. In some embodiments, the alloy can comprise 5.00-7.00 wt. % cerium, 0.25-1.00 wt. % silicon, and iron in an amount up to 0.30 wt. %, based on the total weight of the aluminum alloy. In some embodiments, the alloy can comprise 7.00-9.00 wt. % cerium, 2.00-3.00 wt. % silicon, and 0.25-0.75 wt. % iron, based on the total weight of the aluminum alloy. As mentioned above, other alloying elements can be present in amounts of up to 0.05 wt. %, which can be any known in the art to be present in aluminum alloys. Examples of other optional alloying or trace elements include, but not limited to, manganese, zirconium, vanadium, and nitrogen.

Examples of aluminum alloys according to the description herein include those set forth in the Table below, with values provided as weight percent and the balance being aluminum, and "others" including residual or tramp elements such as oxygen, sulfur, hydrogen, nitrogen, etc.:

TABLE

| Alloy # | Ce | Si | Mg | Fe | Other(s) |
|---|---|---|---|---|---|
| 1 | 2.00-4.00 | 0.25-1.00 | 0.25-0.75 |  | 0.05 Max |
| 2 | 2.00-4.00 | 1.00-2.00 | 0.25-0.75 |  | 0.05 Max |
| 3 | 5.00-7.00 | 0.25-1.00 | 0.25-0.75 | 0.30 Max | 0.05 Max |
| 4 | 7.00-9.00 | 2.00-3.00 | 0.25-0.75 | 0.25-0.75 | 0.05 Max |

In some embodiments, alloys described herein can have a higher solidus temperature than common 6xxx series aluminum alloys as well as cast aluminum alloys (e.g. C355.0 and C356.0). In some embodiments, alloys described herein can have good weldability characteristics, which can be beneficial for additive manufacturing processes. The disclosed alloys can also provide good strength and other physical properties.

While the present disclosure has been described in detail in connection with only a limited number of embodiments, it should be readily understood that the present disclosure is not limited to such disclosed embodiments. Rather, the present disclosure can be modified to incorporate any number of variations, alterations, substitutions or equivalent arrangements not heretofore described, but which are commensurate with the spirit and scope of the present disclosure. Additionally, while various embodiments of the present disclosure have been described, it is to be understood that aspects of the present disclosure may include only some of the described embodiments. Accordingly, the present disclosure is not to be seen as limited by the foregoing description, but is only limited by the scope of the appended claims.

What is claimed is:

1. A method for making an article, comprising:
   inputting a digital model of the article into an additive manufacturing apparatus or system comprising an energy source; and
   repeatedly applying energy from the energy source to successively applied incremental quantities of a powder to fuse the powder to form the article corresponding to the digital model, wherein the powder comprises an aluminum alloy comprising greater than 2.00 and less than 4.00 wt. % cerium, 0.25-3.00 wt. % silicon, 0.25-0.75 wt. % magnesium, 0-0.75 wt. % iron, 0-0.05 wt. % other alloying elements, and the balance of aluminum, based on the total weight of the aluminum alloy.

2. The method of claim 1, wherein the energy source sinters the incremental quantities of the aluminum alloy powder.

3. The method of claim 1, wherein the energy source melts or fluidizes the incremental quantities of the aluminum alloy powder.

4. The method of claim 1, wherein the energy source provides homogeneous melting of the incremental quantities of the aluminum alloy powder.

5. The method of claim 1, further comprising providing an inert atmosphere around the aluminum alloy powder.

6. The method of claim 1, further comprising:
   selectively exposing incremental quantities of aluminum alloy powder in a layer of a powder bed over a support with a laser or electron beam to fuse the selectively exposed aluminum alloy powder in a pattern over the support corresponding to a layer of the digital model of the article, and repeatedly;
   providing a layer of the powder over the selectively exposed layer and selectively exposing incremental quantities of aluminum alloy powder in the layer to fuse the selectively exposed aluminum alloy powder in a pattern corresponding to another layer of the digital model of the article.

7. The method of claim 6, wherein providing additional layers of the powder includes re-positioning the support to maintain each layer being fused at a constant position with respect to the laser or electron beam.

8. The method of claim 1, wherein the aluminum alloy comprises 0.25-1.00 wt. % silicon, based on the total weight of the aluminum alloy.

9. The method of claim 1, wherein the aluminum alloy comprises 1.00-2.00 wt. % silicon, based on the total weight of the aluminum alloy.

10. The method of claim 1, wherein the aluminum alloy comprises 2.00-3.00 wt. % silicon, based on the total weight of the aluminum alloy.

11. The method of claim 1, wherein the aluminum alloy comprises iron in an amount up to 0.30 wt. %, based on the total weight of the aluminum alloy.

12. The method of claim 1, wherein the aluminum alloy comprises 0.25-0.75 wt. % iron, based on the total weight of the aluminum alloy.

* * * * *